US00RE42801E

(19) United States
(12) Reissued Patent
Higuchi et al.

(10) Patent Number: US RE42,801 E
(45) Date of Reissued Patent: Oct. 4, 2011

(54) THREE-PIECE SOLID GOLF BALL

(75) Inventors: Hiroshi Higuchi, Yokohama (JP); Hisashi Yamagishi, Yokohama (JP); Yoshinori Egashira, Hidaka (JP); Tadatoshi Yamada, Mitaka (JP)

(73) Assignee: Bridgestone Sports Co., Ltd., Tokyo (JP)

( * ) Notice: This patent is subject to a terminal disclaimer.

(21) Appl. No.: 10/183,147

(22) Filed: Jun. 28, 2002

Related U.S. Patent Documents

Reissue of:
(64) Patent No.: 5,553,852
Issued: Sep. 10, 1996
Appl. No.: 08/271,953
PCT Filed: Jul. 8, 1994

(30) Foreign Application Priority Data

Jul. 8, 1993 (JP) ..... 5-193065

(51) Int. Cl.
*A63B 37/06* (2006.01)
(52) U.S. Cl. ..... 473/373; 473/378
(58) Field of Classification Search ..... 473/351, 473/373, 374, 367, 368, 370, 371, 376, 377, 473/378
See application file for complete search history.

(56) References Cited

U.S. PATENT DOCUMENTS 2,741,480 A 4/1956 Smith
2,973,800 A 3/1961 Muccino
3,053,539 A 9/1962 Piechowski
3,264,272 A 8/1966 Rees
3,313,545 A 4/1967 Bartsch
3,437,718 A 4/1969 Rees
3,454,280 A 7/1969 Harrison et al.
3,458,205 A 7/1969 Smith et al.
3,502,338 A 3/1970 Cox
3,534,965 A 10/1970 Harrison et al.
3,572,721 A 3/1971 Harrison et al.

(Continued)

FOREIGN PATENT DOCUMENTS

CA 2 137 841 12/1994

(Continued)

OTHER PUBLICATIONS

*Bridgestone Sports Co.. Ltd* v. *Callaway Golf Company et al.;* United States District Court for the Northern District of Georgia, Atlanta Division (Civil Action No., 1 00-CV-1871), fully briefed Motion for Partial Summary Judgement.

(Continued)

*Primary Examiner* — Raeann Gorden
(74) *Attorney, Agent, or Firm* — Sughrue Mion, PLLC

(57) ABSTRACT

A three-piece solid golf ball comprising a center core, an intermediate layer, and a cover. The center core (1) has a diameter of at least 29 mm, a hardness in the range of 45-80 JIS C and a specific gravity of less than 1.4. The intermediate layer (2) has a thickness of at least 1 mm, a specific gravity of less than 1.2, and a hardness of at least 85 on JIS C scale. The cover (3) has a thickness of 1-3 mm and a hardness of 50-85 JIS C. The ball has a good total balance of properties in that feeling and controllability are improved at no sacrifice of flying performance and durability.

167 Claims, 1 Drawing Sheet

U.S. PATENT DOCUMENTS

| | | | | | |
|---|---|---|---|---|---|
| 3,819,768 | A | | 6/1974 | Molitor | |
| 3,883,145 | A | | 5/1975 | Cox et al. | |
| 3,989,568 | A | | 11/1976 | Isaac | |
| 4,076,255 | A | | 2/1978 | Moore et al. | |
| 4,085,937 | A | | 4/1978 | Schenk | |
| 4,123,061 | A | | 10/1978 | Dusbiber | |
| 4,272,079 | A | | 6/1981 | Nakade et al. | |
| 4,274,637 | A | | 6/1981 | Molitor | |
| 4,337,946 | A | | 7/1982 | Saito et al. | |
| 4,431,193 | A | * | 2/1984 | Nesbitt | 473/374 |
| 4,570,937 | A | | 2/1986 | Yamada | |
| 4,650,193 | A | | 3/1987 | Molitor et al. | |
| 4,674,751 | A | | 6/1987 | Molitor et al. | |
| 4,679,795 | A | | 7/1987 | Melvin et al. | |
| 4,688,801 | A | | 8/1987 | Reiter | |
| 4,690,981 | A | | 9/1987 | Statz | |
| 4,714,253 | A | * | 12/1987 | Nakahara et al. | 473/373 |
| 4,720,111 | A | | 1/1988 | Yamada | |
| 4,781,383 | A | | 11/1988 | Kamada et al. | |
| 4,798,386 | A | | 1/1989 | Berard | |
| 4,848,770 | A | | 7/1989 | Shama | |
| 4,852,884 | A | | 8/1989 | Sullivan | |
| 4,858,923 | A | | 8/1989 | Gobush et al. | |
| 4,858,924 | A | | 8/1989 | Saito et al. | |
| 4,863,167 | A | | 9/1989 | Matsuki et al. | |
| 4,884,814 | A | | 12/1989 | Sullivan | |
| 4,911,451 | A | | 3/1990 | Sullivan et al. | |
| 4,919,434 | A | | 4/1990 | Saito | |
| 4,968,038 | A | | 11/1990 | Yamada | |
| 4,979,746 | A | | 12/1990 | Gentiluomo | |
| 4,984,804 | A | | 1/1991 | Yamada et al. | |
| 4,986,545 | A | | 1/1991 | Sullivan | |
| 5,002,281 | A | | 3/1991 | Nakahara et al. | |
| 5,019,319 | A | | 5/1991 | Nakamura et al. | |
| 5,026,067 | A | | 6/1991 | Gentiluomo | |
| 5,048,838 | A | * | 9/1991 | Chikaraishi et al. | 473/374 |
| 5,068,151 | A | | 11/1991 | Nakamura | |
| 5,072,944 | A | | 12/1991 | Nakahara et al. | |
| 5,096,201 | A | | 3/1992 | Egashira et al. | |
| 5,098,105 | A | | 3/1992 | Sullivan | |
| 5,104,126 | A | | 4/1992 | Gentiluomo | |
| 5,120,791 | A | | 6/1992 | Sullivan | |
| 5,156,405 | A | | 10/1992 | Kitaoh et al. | |
| 5,184,828 | A | | 2/1993 | Kim et al. | |
| 5,187,013 | A | | 2/1993 | Sullivan | |
| 5,197,740 | A | | 3/1993 | Pocklington et al. | |
| 5,222,739 | A | | 6/1993 | Horiuchi et al. | |
| 5,244,969 | A | | 9/1993 | Yamada | |
| 5,253,871 | A | | 10/1993 | Viollaz | |
| 5,255,922 | A | | 10/1993 | Proudfit | |
| 5,273,286 | A | | 12/1993 | Sun | |
| 5,273,287 | A | | 12/1993 | Molitor et al. | |
| 5,274,041 | A | | 12/1993 | Yamada | |
| 5,281,651 | A | | 1/1994 | Arjunan et al. | |
| 5,304,608 | A | | 4/1994 | Yabuki et al. | |
| 5,306,760 | A | | 4/1994 | Sullivan | |
| 5,312,857 | A | | 5/1994 | Sullivan | |
| 5,314,187 | A | * | 5/1994 | Proudfit | 473/373 |
| 5,324,783 | A | | 6/1994 | Sullivan | |
| 5,328,959 | A | | 7/1994 | Sullivan | |
| 5,334,673 | A | | 8/1994 | Wu | |
| 5,338,610 | A | | 8/1994 | Sullivan | |
| 5,368,304 | A | | 11/1994 | Sullivan et al. | |
| 5,403,010 | A | | 4/1995 | Yabuki et al. | |
| 5,433,447 | A | | 7/1995 | Pocklington | |
| 5,439,227 | A | | 8/1995 | Egashira et al. | |
| 5,470,075 | A | | 11/1995 | Nesbitt et al. | |
| 5,482,285 | A | | 1/1996 | Yabuki et al. | |
| 5,490,673 | A | | 2/1996 | Hiraoka | |
| 5,490,674 | A | | 2/1996 | Hamada et al. | |
| 5,492,972 | A | | 2/1996 | Stefani | |
| 5,553,852 | A | | 9/1996 | Higuchi et al. | |
| 5,586,950 | A | | 12/1996 | Endo | |
| 5,733,206 | A | | 3/1998 | Nesbitt et al. | |
| 5,803,831 | A | | 9/1998 | Sullivan et al. | |
| 5,836,833 | A | | 11/1998 | Shimosaka et al. | |
| 5,876,294 | A | | 3/1999 | Yamagishi et al. | |
| 6,210,293 | B1 | | 4/2001 | Sullivan | |
| 6,213,894 | B1 | | 4/2001 | Sullivan et al. | |
| 2001/0000506 | A1 | | 4/2001 | Sullivan | |

FOREIGN PATENT DOCUMENTS

| | | | |
|---|---|---|---|
| EP | 0 589 647 | | 9/1993 |
| EP | 0 630 665 | | 5/1994 |
| EP | 0 637 459 | A1 | 7/1994 |
| FR | 2666018 | | 2/1992 |
| GB | 494031 | | 10/1938 |
| GB | 2 185 890 | | 8/1987 |
| GB | 2 228 874 | | 9/1990 |
| GB | 2 232 162 | | 12/1990 |
| GB | 2 245 580 | | 1/1992 |
| GB | 2 248 067 | | 3/1992 |
| GB | 2 264 302 | | 11/1992 |
| GB | 2 278 609 | | 12/1994 |
| GB | 2 291 811 | | 7/1996 |
| GB | 2 291 812 | | 7/1996 |
| JP | 58-923372 | | 6/1983 |
| JP | 59-169865 | | 11/1984 |
| JP | 61-168374 | | 7/1986 |
| JP | 63-105774 | | 5/1988 |
| JP | 63-61029 | | 11/1988 |
| JP | 64-80377 | | 3/1989 |
| JP | 2-28987 | | 6/1990 |
| JP | 2-228978 | | 9/1990 |
| JP | 2-264674 | | 10/1990 |
| JP | 3-3501 | | 1/1991 |
| JP | 3-9769 | | 1/1991 |
| JP | 3-75186 | | 11/1991 |
| JP | 4-48473 | | 8/1992 |
| JP | 4-49427 | | 8/1992 |
| JP | 4-55077 | | 9/1992 |
| JP | 4-244174 | | 9/1992 |
| JP | 5-4110 | | 1/1993 |

OTHER PUBLICATIONS

Test Report to Sumitomo Rubber Industries, Ltd., Chemical Inspection and Testing Institute, Osaka, Japan, dated Oct. 11, 1989.
Selector Guide for Molding and Extrusion Surlyn Ionomer Resin, Du Pont USA.
Expert Report of John Calabria dated Feb. 20, 2007.
Invalidity Expert Report of Dr. David Felker dated Jan. 16, 2007.

* cited by examiner

THREE-PIECE SOLID GOLF BALL

Matter enclosed in heavy brackets [ ] appears in the original patent but forms no part of this reissue specification; matter printed in italics indicates the additions made by reissue.

*More than one reissue application has been filed for the reissue of U.S. Pat. No. 5,553,852, which issued on Sep. 10, 1996 from application Ser. No. 08/271,953, filed Jul. 8, 1994. The reissue applications are U.S. application Ser. No. 10/183,147, filed Jun. 28, 2002 (the present application) and U.S. application Ser. No. 11/111,974, filed Apr. 22, 2005, which is a continuation of Reissue application Ser. No. 10/183,147 (the present application), all of which are reissues of U.S. Pat. No. 5,553,852.*

BACKGROUND OF THE INVENTION

1. Field of the Invention

This invention relates to three-piece solid golf balls comprising a center core, an intermediate layer, and a cover and more particularly, to three-piece solid golf balls which are improved in feeling on impact, controllability, and durability.

2. Prior Art

Among a variety of golf balls, thread-wound golf balls and solid golf balls are now popular. The solid golf balls are currently increasing to be a mainstream product. Among them, two-piece solid golf balls consisting of a core and a cover are most widespread.

Most amateur golfers are fond of two-piece solid golf balls which have excellent flying performance and durability although these balls have the disadvantages of a very hard feel on hitting and low control due to rapid ball separation on hitting. For this reason, many of professional golfers and skilled amateur golfers who impose weight on feeling and control prefer wound golf balls, especially wound golf balls using a soft balata cover, to two-piece solid golf balls. The wound golf balls are superior in feeling and control, but inferior in flying distance and durability to the two-piece solid golf balls.

Under the present situation that two-piece solid golf balls and wound golf balls have contradictory characteristics as mentioned above, players make a choice of golf balls depending on their own skill and taste.

In order to develop solid golf balls having a hitting feel approximate to the wound golf balls, two-piece solid golf balls of the soft type have been considered. For such two-piece solid golf balls of the soft type, soft cores must be used. If the cores are soft, however, repulsion becomes low with a concomitant loss of flying performance and durability is considerably deteriorated. That is, the superior flying performance and durability which are a characteristic of two-piece solid golf balls are lost, and in an extreme case, the balls become unacceptable for practical use.

Controllability, which is required even on full shots with drivers, is most important on control shots like approach shots. In an exemplary situation that the next shot should fly beyond the bunker and a short distance from the green edge to the cup, the player who is either professional or amateur will naturally wish to hit a ball with a minimal run. Such controllability of a golf ball largely depends on spin properties.

On a full shot with a club having a relatively large loft, the club loft is dominant to that the ball itself so that almost all balls are given an appropriate amount of spin and few balls overrun. However, on a approach shot over a short distance of 30 or 50 yards, balls will significantly vary in run or controllability. The major factor causing such a difference is not a basic structure, but the identity of cover material. In two-piece solid golf balls, however, covers made of soft material are effective for improving controllability, but detrimental for gaining flying distance.

SUMMARY OF THE INVENTION

Therefore, an object of the present invention is to provide a solid golf ball which is improved in feeling and controllability while maintaining the superior flying performance and durability which are characteristic of solid golf balls, that is, improved in total balance.

In connection with a solid golf ball having a core forming the center and a cover forming the outermost layer, the inventors have found that by providing a relatively hard intermediate layer between the center core and the cover, and controlling the size and specific gravity of the core, intermediate layer and cover, the center core and [core] *cover* can be made relatively soft to improve feeling and controllability without deteriorating flying performance and durability. The feeling and controllability can be improved in a favorable way.

Briefly stated, an intermediate layer having a thickness of at least 1 mm, a specific gravity of less than 1.2, and a hardness of at least 85 on JIS C scale is formed around a center core having a diameter of at least 29 mm and a specific gravity of less than 1.4 and greater than the intermediate layer specific gravity. A cover having a thickness of 1 to 3 mm is formed on the outer surface of the intermediate layer to complete a solid golf ball. Then even when the center core is softened to a JIS C scale hardness of 45 to 80 and the cover softened to a JIS C scale hardness of 50 to 85, the feeling and controllability can be improved at no sacrifice of flying distance and durability. Further when the intermediate layer is formed of a resin composition based on a high repulsion ionomer resin, the hitting feel and controllability can be further improved with no sacrifice of flying distance and durability.

The present invention provides a three-piece solid golf ball comprising a center core, an intermediate layer, and a cover wherein the center core has a diameter of at least 29 mm and a specific gravity of less than 1.4, the intermediate layer has a thickness of at least 1 mm, a specific gravity of less than 1.2, and a hardness of at least 85 on JIS C scale. The cover has a thickness of 1 to 3 mm. The specific gravity of the intermediate layer is lower than the specific gravity of the center core. In one preferred embodiment, the intermediate layer is formed of a composition based on a high repulsion ionomer resin.

BRIEF DESCRIPTION OF THE DRAWING

The sole figure.

DETAILED DESCRIPTION OF THE INVENTION

Figure 1:
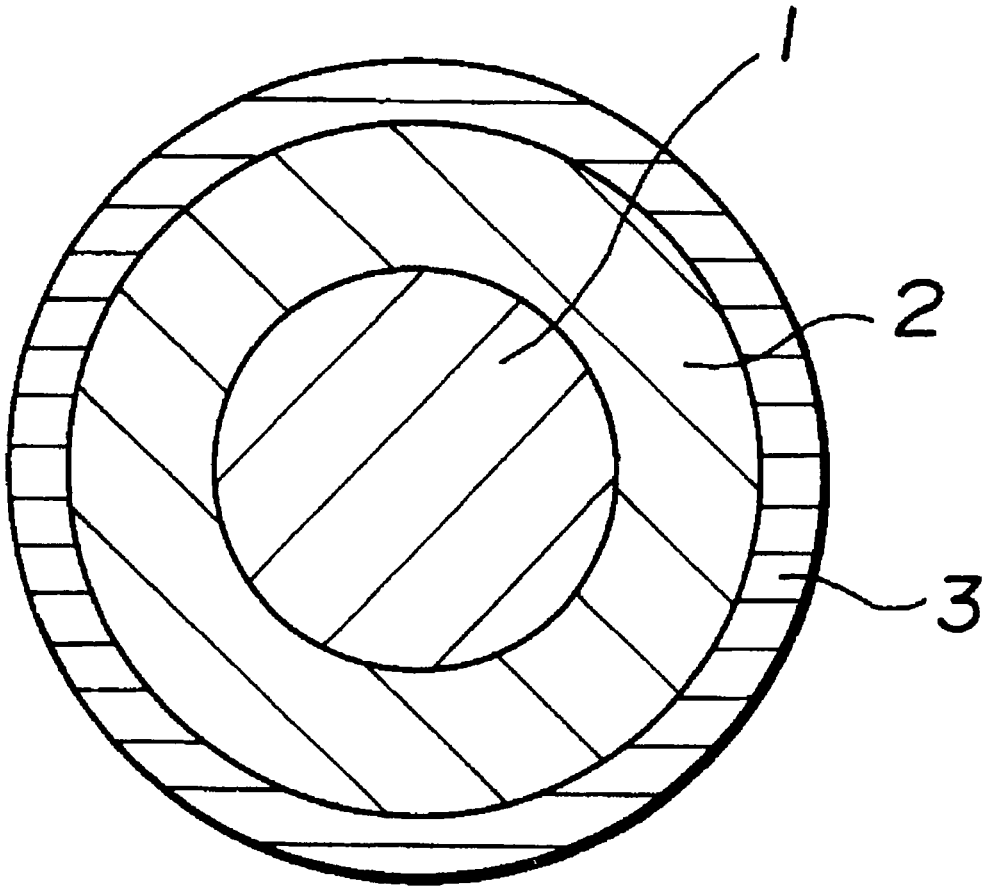
FIG. 1 is a schematic cross section of a three-piece solid golf ball according to the invention.

Referring to FIG. 1, there is schematically illustrated a typical three-piece solid golf ball according to the invention. The ball includes a spherical center core 1 forming the center of the ball and a cover 3 forming the outermost layer of the ball. A relatively hard intermediate layer 2 is disposed between the core 1 and the cover 3. The size and specific gravity of the core 1, intermediate layer 2, and cover 3 are set in specific ranges.

The center core has a diameter of at least 29 mm, preferably 29 to 37 mm and a specific gravity of less than 1.4, preferably 1.05 to 1.38. With a diameter of less than 29 mm, the intermediate layer must be relatively thick with losses of repulsion and feeling. With a specific gravity of 1.4 or more, the ball has a heavier weight which exceeds the weight requirement of golf balls.

On an impact entailing substantial deformation as found on driver shots, the player gets a feeling which largely depend on the hardness of the center core 1 and varies with the club head speed given by the player. Therefore, the hardness of the center core 1 should be set in accordance with the head speed of the target players. In this sense, the center core hardness is not particularly limited although it preferably ranges from 45 to 80, more preferably from 60 to 80 on JIS C scale (at the center core surface).

The center core 1 is generally formed from a well-known rubber composition comprising a base rubber, co-crosslinking agent and peroxide through heating, pressing and molding steps. The base rubber may be one conventionally used in solid golf balls and preferably be selected from polybutadiene rubber and mixtures of polybutadiene rubber and polyisoprene rubber. Use of 1,4-polybutadiene rubber containing more than 90% of cis structure is preferred for high repulsion. The co-crosslinking agents used in conventional solid golf balls include zinc and magnesium salts of unsaturated fatty acids such as methacrylic acid and acrylic acid and esters of unsaturated fatty acids such as trimethylpropane trimethacrylate and they may be used in the present invention. Zinc acrylate is preferred for high repulsion. The co-crosslinking agent is blended in amounts of about 15 to 30 parts by weight per 100 parts by weight of the base rubber. The peroxide may be selected from a variety of peroxides, preferably dicumyl peroxide and mixtures of dicumyl peroxide and 1,1-bis(t-butylperoxy)-3,3,5-trimethylcyclohexane. The peroxide is blended in amounts of about 0.5 to 1 part by weight per 100 parts by weight of the base rubber. If desired, zinc oxide and barium sulfate may be blended in the rubber composition for specific gravity adjustment while antioxidants may also be blended.

The intermediate layer 2 has a radial thickness of at least 1 mm, preferably 1.5 to 3.5 mm, a specific gravity of less than 1.2, preferably 0.9 to 1 and lower than the center core specific gravity, and a hardness of at least 85, preferably 85 to 100 on JIS C scale. With a thickness of less than 1 mm, repulsion is lowered to reduce flying distance. With a specific gravity of 1.2 or more, the center core must have a relatively low specific gravity so that the golf ball may be increased in inertia moment and reduced in spin property and thus lose some controllability. A similar detrimental effect is observed when the intermediate layer specific gravity is greater than the center core specific gravity. A layer with a JIS C scale hardness of less than 85 detracts from flying performance. The intermediate layer preferably has an outer diameter of 38 to 41 mm though not limited thereto. Also preferably the difference in specific gravity between the center core and the intermediate layer is 0.1 or more, especially 0.1 to 0.5 though not limited thereto.

The intermediate layer 2 is effective in compensating for lowering repulsion of the center core 1 which is made soft. It is then formed of a relatively hard (JIS C scale hardness≧85), repulsive material. Although the material is not critical, preferred materials are ionomer resins, for example, Himilan 1706 and 1605 commercially available from Mitsui-dupont Polychemical K.K. and Surlyn commercially available from E.I. dupont. A 1:1 blend of Himilan 1706 and Himilan 1605 is most preferred. In addition to the ionomer resin, the composition of which the intermediate layer is formed may further contain weight control agents, for example, inorganic fillers such as zinc oxide and barium sulfate, coloring agents such as titanium dioxide, and other additives.

The cover 3 has a radial thickness of 1 to 3 mm, preferably 1.5 to 2.5 mm. A cover more than 3 mm thick is low in repulsion whereas a cover less than 1 mm thick is low in durability such as cut resistance. Although the hardness of the cover 3 is not particularly limited, it is preferably set in a relatively soft range of 50 to 85, more preferably 60 to 85 on JIS C scale because in this range, improvements in all of repulsion (flying performance), durability and controllability are expected.

The cover 3 is generally formed of resinous materials which are conventionally used as the cover of solid golf balls, preferably those materials which are relatively soft (JIS C scale hardness 50 to 85) and highly repulsive. Examples include ionomer resins such as Himilan 1650 commercially available from Mitsui-dupont Polychemical K.K., Surlyn 8120 commercially available from E.I. dupont, and mixtures thereof, thermoplastic polyester elastomers such as Hytrel 4047 commercially available from Toray-dupont K.K, and balata resins. If necessary, inorganic fillers may be blended in these resins for coloring purposes.

EXAMPLE

Examples of the present invention are given below by way of illustration and not by way of limitation.

Examples and Comparative Examples

Using a center core, intermediate layer, and cover having the composition shown in Table 1, three-piece solid golf balls (Examples 1-6, Comparative Examples 1-3) were prepared. The center core was prepared by kneading the respective components in a roll mill and pressure molding at 155° C. for 15 minutes. The intermediate layer was formed by injection molding so as to enclose the outer surface of the center core. The cover was formed around the intermediate layer by injection molding. The three-piece solid golf balls were completed in this way. The parameters associated with the core, intermediate layer and cover are shown in Table 2.

The golf balls were evaluated for spin characteristic, flying performance, feeling, and durability by the following tests. The results are shown in Table 2.

Spin Characteristic

Using a swing robot manufactured by True Temper Co., the ball was hit by the driver at a head speed of 45 m/s (abbreviated as W1 HS45 in Table 2) and by the sand wedge at a head speed of 17.6 m/s (abbreviated as SW HS17.6 in Table 2). The ball spin (rpm) was observed using a science eye (manufactured by Bridgestone Corporation).

Feeling

Professional golfers evaluated a feeling on impact according to the following criterion.

○: good
Δ: average
x: poor

Flying Performance

In the spin and feeling tests, the flying distance the ball traveled was also measured. Total evaluation was made according to the following criterion.

○: good
Δ: average
x: poor

Durability

Using a flywheel hitting machine, the ball was repeatedly hit at a head speed of 38 m/s until the ball was broken. With the number of hits counted, the ball was rated according to the following criterion.

○: good
Δ: average
x: poor

TABLE 1

| | Example | | | | | | Comparative Example | | |
|---|---|---|---|---|---|---|---|---|---|
| | 1 | 2 | 3 | 4 | 5 | 6 | 1 | 2 | 3 |
| Center core | | | | | | | | | |
| Cis-1,4-polybutadiene | 100 | 100 | 100 | 100 | 100 | 100 | 100 | 100 | 100 |
| Zinc acrylate | 20 | 20 | 20 | 30 | 20 | 20 | 20 | 25 | 20 |
| Zinc oxide | 56 | 36 | 36 | 20 | 23 | 10 | 90 | 25 | 55 |
| Antioxidant | 0.2 | 0.2 | 0.2 | 0.2 | 0.2 | 0.2 | 0.2 | 0.2 | 0.2 |
| Dicumyl peroxide | 0.65 | 0.65 | 0.65 | 0.65 | 0.65 | 0.65 | 0.65 | 0.65 | 0.65 |
| Intermediate layer | | | | | | | | | |
| Himilan 1706 | 50 | 50 | 50 | 50 | 50 | 50 | 50 | 50 | 50 |
| Himilan 1605 | 50 | 50 | 50 | 50 | 50 | 50 | 50 | 50 | 50 |
| Cover | | | | | | | | | |
| Himilan 1650 | 50 | 50 | 50 | | | 50 | 50 | | 50 |
| Surlyn 8120 | 50 | 50 | 50 | | | 50 | 50 | | 50 |
| Hytrel 4047 | | | | 100 | | | | 100 | |
| Trans-isoprene rubber | | | | | 90 | | | | |
| Natural rubber | | | | | 10 | | | | |

Note:
The amounts of components blended are parts by weight and their proportion is independent among the center core, intermediate layer, and cover.

TABLE 2

| | Example | | | | | | Comparative Example | | |
|---|---|---|---|---|---|---|---|---|---|
| | 1 | 2 | 3 | 4 | 5 | 6 | 1 | 2 | 3 |
| Center core | | | | | | | | | |
| Outer diameter, mm | 31.52 | 35.28 | 35.28 | 35.28 | 35.29 | 36.40 | 27.68 | 35.24 | 31.52 |
| Hardness, JIS C | 66 | 66 | 66 | 79 | 66 | 66 | 66 | 73 | 66 |
| Specific gravity | 1.36 | 1.24 | 1.24 | 1.19 | 1.16 | 1.07 | 1.56 | 1.19 | 1.35 |
| Intermediate layer | | | | | | | | | |
| Thickness, mm | 3.4 | 1.7 | 2.2 | 2.2 | 17 | 2.0 | 5.7 | 1.8 | 1.6 |
| Hardness, JIS C | 91 | 91 | 91 | 91 | 91 | 91 | 91 | 82 | 91 |
| Specific gravity | 0.95 | 0.95 | 0.95 | 0.95 | 0.95 | 0.95 | 0.95 | 0.97 | 0.95 |
| Outer diameter. mm | 38.35 | 38.73 | 39.65 | 39.66 | 38.73 | 40.40 | 39.00 | 38.91 | 34.56 |
| Cover | | | | | | | | | |
| Thickness, mm | 2.2 | 2.0 | 1.5 | 1.5 | 2.0 | 1.8 | 1 8 | 1.9 | 4.0 |
| Specific gravity | 0.97 | 0.97 | 0.97 | 1.10 | 1.13 | 0.97 | 0.97 | 1.10 | 0.97 |
| Hardness, JIS C | 82 | 82 | 82 | 61 | 78 | 82 | 82 | 61 | 82 |
| Ball | | | | | | | | | |
| Outer diameter, mm | 42.68 | 42.67 | 42.67 | 42.70 | 42.70 | 44.00 | 42.65 | 42.63 | 42.65 |
| Weight, g | 45.50 | 45.45 | 45.50 | 45.55 | 45.53 | 45.60 | 45.50 | 45.55 | 45.50 |
| Performance | | | | | | | | | |
| Spin (rpm) W1 HS45 | 3300 | 3020 | 3030 | 3920 | 3600 | 3030 | 35 | 3600 | 3250 |
| SW HS17.6 | 3900 | 4000 | 4300 | 6390 | 5800 | 4100 | 4100 | 4050 | 3500 |
| Feeling | Δ | ○ | ○ | Δ | ○ | ○ | X | ○ | ○ |
| Flying performance | ○ | ○ | ○ | ○ | Δ | ○ | X | X | X |
| Durability | ○ | ○ | ○ | ○ | ○ | ○ | ○ | ○ | ○ |

As is evident from Table 2, the three-piece solid golf balls of the present invention have a good balance of properties in that the center core and cover can be made soft to ensure a pleasant feeling and controllability (spin) without deteriorating flying performance and durability.

There has been described a three-piece solid golf ball which includes a core, intermediate layer and cover having controlled size, hardness and specific gravity so that the ball has a good total balance of properties in that a relatively soft center core and cover are used to ensure a pleasant feeling and controllability at no sacrifice of flying performance and durability.

Japanese Patent Application No. 5-193065 is incorporated herein by reference.

Although one preferred embodiment have been described, many modifications and variations may be made thereto in the light of the above teachings. It is therefore to be understood that within the scope of the appended claims, the invention may be practiced otherwise than as specifically described.

We claim:

1. A three-piece solid golf ball comprising:

a center core, an intermediate layer, and a cover enclosing [the] *said center* core through the intermediate layer, said center core having a diameter of at least 29 mm and a specific gravity of less than 1.4, said intermediate layer having a thickness of at least 1 mm, a specific gravity of less than 1.2, and a hardness of at least 85 on JIS C scale, the specific gravity of said intermediate layer being lower than the specific gravity of said center core, and said cover having a thickness of 1 to 3 mm and being softer than said intermediate layer,

*wherein said center core has a hardness between about 45 to 80 on the JIS C scale.*

2. The golf ball of claim 1 wherein said intermediate layer is formed of a high repulsion ionomer resin base composition.

3. The golf ball of claim 1 wherein said center core has a hardness of 45 to 80 on JIS C scale and said cover has a hardness of 50 to 85 on JIS C scale.

4. The golf ball of claim 1 wherein said center core is comprised of a polybutadiene base rubber composition.

5. The golf ball of claim 1 wherein the diameter of said center core is in the range of 29-37 mm.

6. The golf ball of claim 1 wherein a difference in the specific gravity between the center core and the intermediate layer is in the range of 0.1 to 0.5.

7. The golf ball of claim 1 wherein the specific gravity of said intermediate layer is in the range of 0.9 to 1.0.

8. The golf ball of claim 1 wherein the hardness of said intermediate layer is in the range of 85-100 on JIS C.

*9. The three-piece golf ball of claim 1, wherein said cover comprises a thermoplastic polyester elastomer.*

*10. The three-piece golf ball of claim 1, wherein said cover comprises a thermoplastic polyester elastomer having a chemical structure of a block copolymer consisting of a hard segment and a soft segment made of polyester and having a Shore D of about 40.*

*11. The three-piece golf ball of claim 1, wherein said cover comprises balata resins.*

*12. The three-piece golf ball of claim 1, wherein said cover has the following composition in parts by weight: 100 thermoplastic polyester elastomer having a chemical structure of a block copolymer consisting of a hard segment and a soft segment made of polyester and having a Shore D of about 40.*

*13. The three-piece golf ball of claim 1, wherein said cover has the following composition in parts by weight: 100 thermoplastic polyester.*

*14. The three-piece golf ball of claim 1, wherein said cover has the following composition in parts by weight:*

*90 trans-isoprene rubber, and*

*10 natural rubber.*

*15. The three-piece golf ball of claim 1, wherein said cover comprises rubber.*

*16. The three-piece golf ball of claim 1, wherein said intermediate layer has a hardness between 85 and 91 on the JIS C scale.*

*17. The three-piece golf ball of claim 1, wherein said intermediate layer has a specific gravity between 0.95 and 1.2.*

*18. The three-piece golf ball of claim 1, wherein said center core has a specific gravity between 1.16 and 1.19.*

*19. The three-piece golf ball of claim 1, wherein said intermediate layer has a specific gravity between 1.0 and 1.2.*

*20. The three-piece golf ball of claim 1, wherein said intermediate layer has a thickness between 1.0 mm and about 1.5 mm.*

*21. The three-piece golf ball of claim 1, wherein said intermediate layer has a specific gravity of about 0.95 and 1.*

*22. The three-piece golf ball of claim 1, wherein said cover has a hardness of about 50 on the JIS C scale.*

*23. The three-piece golf ball of claim 1, wherein the said center core has a hardness of about 80 on the JIS C scale.*

*24. The three-piece golf ball of claim 1, wherein said intermediate layer has a thickness between about 1.5 mm and 3.5 mm.*

*25. The three-piece golf ball of claim 1, wherein said center core has a hardness between about 45 and 66 on the JIS C scale.*

*26. The three-piece golf ball of claim 25, wherein said intermediate layer has a thickness between about 1.5 mm and 3.5 mm.*

*27. A three-piece solid golf ball, comprising:*

*a center core, an intermediate layer, and a cover enclosing said center core through the intermediate layer;*

*said center core having a diameter of at least 29 mm and a specific gravity of less than 1.4;*

*said intermediate layer formed of an ionomer resin and having a thickness of at least 1 mm, a specific gravity of less than 1.2, and a hardness of at least 85 on JIS C scale, the specific gravity of said intermediate layer being lower than the specific gravity of said center core; and said cover having a thickness of 1 to 3 mm and being softer than said intermediate layer,*

*wherein said center core has a hardness between about 45 to 80 on the JIS C scale.*

*28. The three-piece golf ball of claim 27, wherein said center core is formed from a rubber composition comprising a base rubber with a co-crosslinking agent.*

*29. The three-piece golf ball of claim 27, wherein said center core is formed from a rubber composition comprising a base rubber with a peroxide.*

*30. The three-piece golf ball of claim 27, wherein said center core is formed from a rubber composition comprising a base rubber with a co-crosslinking agent and peroxide.*

*31. The three-piece golf ball of claim 27, wherein said center core is formed from a base rubber that has a mixture of polybutadiene rubber and polyisoprene rubber.*

*32. The three-piece golf ball of claim 27, wherein said center core is formed with cis-1,4 polybutadiene rubber.*

*33. The three-piece golf ball of claim 27, wherein said center core is formed with cis-1,4 polybutadiene rubber containing more than 90 percent cis structure.*

*34. The three-piece golf ball of claim 27, wherein said center core is formed from a composition comprising a base rubber with a co-crosslinking agent and peroxide, and wherein said co-crosslinking agent has zinc and magnesium salts of unsaturated fatty acids or esters of unsaturated fatty acids.*

*35. The three-piece golf ball of claim 27, wherein said center core is formed from a rubber composition comprising a base rubber with a co-crosslinking agent and peroxide, and wherein said co-crosslinking agent includes zinc acrylate.*

*36. The three-piece golf ball of claim 27, wherein said center core is formed from a rubber composition comprising a base rubber with a co-crosslinking agent and peroxide, and wherein said co-crosslinking agent is blended in amounts of 15 to 30 parts by weight per 100 parts by weight of said base rubber composition.*

*37. The three-piece golf ball of claim 27, wherein said center core is formed from a rubber composition comprising a base rubber with a co-crosslinking agent and peroxide, and wherein said peroxide is a mixture of dicumyl peroxide and 1,1-bis(t-butelperoxy)-3,3,5-trimeticyclohexane.*

*38. The three-piece golf ball of claim 27, wherein said center core is formed from a rubber composition comprising a base rubber with a co-crosslinking agent and peroxide, and wherein said peroxide is blended in amounts of about 0.5 to 1 part by weight per 100 parts by weight of said base rubber composition.*

*39. The three-piece golf ball of claim 27, wherein said center core is formed from a rubber composition comprising a base rubber with zinc oxide and barium sulfate blended in.*

*40. The three-piece golf ball of claim 27, wherein said center core has the following composition in parts by weight:*

*100 cis-1,4 polybutadiene,*

*20 zinc acrylate, and*

*wherein said center core further comprises dicumyl peroxide.*

*41. The three-piece golf ball of claim 27, wherein said center core comprises high cis polybutadiene.*

*42. The three-piece golf ball of claim 27, wherein said center core has the following composition in parts by weight:*

*100 cis-1,4 polybutadiene,*

*30 zinc acrylate, and*

*wherein said center core further comprises dicumyl peroxide.*

*43. The three-piece golf ball of claim 27, wherein said center core has the following composition in parts by weight:*

*100 cis-1,4 polybutadiene,*

*30 zinc acrylate, and*

*0.65 dicumyl peroxide.*

*44. The three-piece golf ball of claim 27, wherein said center core has the following composition in parts by weight:*

*100 cis-1,4 polybutadiene,*

*20 zinc acrylate, and*

*0.65 dicumyl peroxide.*

*45. The three-piece golf ball of claim 27, wherein said center core is formed from a rubber composition comprising a base rubber with and dicumyl peroxide.*

*46. The three-piece golf ball of claim 27, wherein said center core comprises:*

*cis-1,4 polybutadiene,*

*zinc acrylate, and*

*dicumyl peroxide.*

*47. The three-piece golf ball of claim 27, wherein said intermediate layer comprises an ethylene-methacrylic acid copolymer ionomer resin neutralized with zinc ion and having a Shore D hardness of about 60.*

*48. The three-piece golf ball of claim 27, wherein said intermediate layer comprises an ethylene-methacrylic acid copolymer ionomer resin neutralized with sodium ion and having a Shore D hardness of about 61.*

*49. The three-piece golf ball of claim 27, wherein said intermediate layer comprises a blend of ionomer resins.*

*50. The three-piece golf ball of claim 27, wherein said intermediate layer comprises a blend of an ethylene-methacrylic acid copolymer ionomer resin neutralized with zinc ion and having a Shore D hardness of about 60 and an ethylene-methacrylic acid copolymer ionomer resin neutralized with sodium ion and having a Shore D hardness of about 61.*

*51. The three-piece golf ball of claim 27, wherein said intermediate layer comprises a 1:1 blend of an ethylene-methacrylic acid copolymer ionomer resin neutralized with zinc ion and having a Shore D hardness of about 60 and an ethylene-methacrylic acid copolymer ionomer resin neutralized with sodium ion and having a Shore D hardness of about 61.*

*52. The three-piece golf ball of claim 27, wherein said intermediate layer comprises an ionomer resin having a weight control filler and a coloring agent.*

*53. The three-piece golf ball of claim 27, wherein said intermediate layer comprises an ionomer resin having one of zinc oxide and barium sulfate and having titanium dioxide.*

*54. The three-piece golf ball of claim 27, wherein said intermediate layer has the following composition in parts by weight:*

*50 ethylene-methacrylic acid copolymer ionomer resin neutralized with zinc ion and having a Shore D hardness of about 60 and*

*50 ethylene-methacrylic acid copolymer ionomer resin neutralized with sodium ion and having a Shore D hardness of about 61.*

*55. The three-piece golf ball of claim 27, wherein said cover comprises a resin.*

*56. The three-piece golf ball of claim 27, wherein said cover comprises an ionomer resin.*

*57. The three-piece golf ball of claim 27, wherein said cover comprises a blend of ionomer resins.*

*58. The three-piece golf ball of claim 27, wherein said cover comprises ethylene-methacrylic acid copolymer ionomer resin neutralized with zinc ion and having a Shore D hardness of about 57.*

*59. The three-piece golf ball of claim 27, wherein said cover comprises an ethylene-methacrylic acid copolymer ionomer resin neutralized with sodium ion and having a Shore D hardness of about 40.*

*60. The three-piece golf ball of claim 27, wherein said cover comprises an ionomer resin with inorganic fillers blended therein for coloring.*

*61. The three-piece golf ball of claim 27, wherein said cover has the following composition in parts by weight:*

*50 ethylene-methacrylic acid copolymer ionomer resin neutralized with zinc ion and having a Shore D hardness of about 57, and*

*50 ethylene-methacrylic acid copolymer ionomer resin neutralized with sodium ion and having a Shore D hardness of about 40.*

*62. The three-piece golf ball of claim 27, wherein said cover comprises a blend of two low acid ionomer resins in equal parts by weight.*

*63. The three-piece golf ball of claim 27, wherein said center core has a diameter between about 29 mm and 37 mm.*

*64. The three-piece golf ball of claim 27, wherein said center core has a diameter of about 32 mm.*

*65. The three-piece golf ball of claim 27, wherein said center core has a diameter of about 31.5 mm.*

*66. The three-piece golf ball of claim 27, wherein said center core has a diameter of about 35 mm.*

*67. The three-piece golf ball of claim 27, wherein said center core has a diameter of about 35.3 mm.*

*68. The three-piece golf ball of claim 27, wherein said center core has a diameter of about 36 mm.*

*69. The three-piece golf ball of claim 27, wherein said center core has a diameter of about 36.4 mm.*

*70. The three-piece golf ball of claim 27, wherein said center core has a diameter of about 37 mm.*

*71. The three-piece golf ball of claim 27, wherein said center core has a diameter of about 29 mm.*

*72. The three-piece golf ball of claim 27, wherein said center core plus intermediate layer has a diameter between about 38 mm and 41 mm.*

*73. The three-piece golf ball of claim 27, wherein said center core plus intermediate layer has a diameter of about 38 mm.*

*74. The three-piece golf ball of claim 27, wherein said center core plus intermediate layer has a diameter of about 38.4 mm.*

*75. The three-piece golf ball of claim 27, wherein said center core plus intermediate layer has a diameter of about 39 mm.*

*76. The three-piece golf ball of claim 27, wherein said core center plus intermediate layer has a diameter of about 38.7 mm.*

*77. The three-piece golf ball of claim 27, wherein said center core plus intermediate layer has a diameter of about 40 mm.*

*78. The three-piece golf ball of claim 27, wherein said center core plus intermediate layer has a diameter of about 39.7 mm.*

*79. The three-piece golf ball of claim 27, wherein said center core plus intermediate layer has a diameter of about 40.4 mm.*

*80. The three-piece golf ball of claim 27, wherein said center core has a hardness between about 60 to 80 on the JIS C scale.*

*81. The three-piece golf ball of claim 27, wherein said center core has a hardness of about 66 on the JIS C scale.*

*82. The three-piece golf ball of claim 27, wherein said center core has a hardness of about 79 on the JIS C scale.*

*83. The three-piece golf ball of claim 27, wherein said center core has a hardness less than the hardness of said intermediate layer.*

*84. The three-piece golf ball of claim 27, wherein said intermediate layer has a hardness of about 91 on the JIS C scale.*

*85. The three-piece golf ball of claim 27, wherein said cover has a hardness between about 50 and 85 on the JIS C scale.*

*86. The three-piece golf ball of claim 27, wherein said cover has a hardness between about 60 and 85 on the JIS C scale.*

*87. The three-piece golf ball of claim 27, wherein said cover has a hardness of about 82 on the JIS C scale.*

*88. The three-piece golf ball of claim 27, wherein said cover has a hardness of about 61 on the JIS C scale.*

*89. The three-piece golf ball of claim 27, wherein said cover has a hardness of about 78 on the JIS C scale.*

*90. The three-piece golf ball of claim 27, wherein said center core has a specific gravity between about 1.05 and 1.38.*

*91. The three-piece golf ball of claim 27, wherein said center core has a specific gravity of about 1.36.*

*92. The three-piece golf ball of claim 27, wherein said center core has a specific gravity of about 1.24.*

*93. The three-piece golf ball of claim 27, wherein said center core has a specific gravity of about 1.19.*

*94. The three-piece golf ball of claim 27, wherein said center core has a specific gravity of about 1.16.*

*95. The three-piece golf ball of claim 27, wherein said center core has a specific gravity of about 1.07.*

*96. The three-piece golf ball of claim 27, wherein said intermediate layer has a specific gravity that is between about 0.9 and 1.*

*97. The three-piece golf ball of claim 27, wherein a difference between a specific gravity of said center core and a specific gravity of said intermediate is about 0.1.*

*98. The three-piece golf ball of claim 27, wherein a difference between a specific gravity of said center core and a specific gravity of said intermediate is between about 0.1 and 0.5.*

*99. The three-piece golf ball of claim 27, wherein said intermediate layer has a specific gravity of about 0.95.*

*100. The three-piece golf ball of claim 27, said cover has a specific gravity of about 0.97.*

*101. The three-piece golf ball of claim 27, wherein said cover has a specific gravity of about 1.1.*

*102. The three-piece golf ball of claim 27, wherein said cover has a specific gravity of about 1.13.*

*103. The three-piece golf ball of claim 27, wherein said intermediate layer has a thickness of about 1 mm.*

*104. The three-piece golf ball of claim 27, wherein said intermediate layer has a thickness between about 1.5 mm and 3.5 mm.*

*105. The three-piece golf ball of claim 27, wherein said intermediate layer has a thickness of about 3.4 mm.*

*106. The three-piece golf ball of claim 27, wherein said intermediate layer has a thickness of about 1.7 mm.*

*107. The three-piece golf ball of claim 27, wherein said intermediate layer has a thickness of about 2.2 mm.*

*108. The three-piece golf ball of claim 27, wherein said intermediate layer has a thickness of about 2.0 mm.*

*109. The three-piece golf ball of claim 27, wherein said cover has a thickness between about 1.5 mm and 2.5 mm.*

*110. The three-piece golf ball of claim 27, wherein said cover has a thickness of about 2.2 mm.*

*111. The three-piece golf ball of claim 27, wherein said cover has a thickness of about 2.0 mm.*

*112. The three-piece golf ball of claim 27, wherein said cover has a thickness of about 1.5 mm.*

*113. The three-piece golf ball of claim 27, wherein said cover has a thickness of about 1.8 mm.*

*114. The three-piece golf ball of claim 27, wherein said golf ball has a spin of about 3030 rpm when hit using a swing robot manufactured by True Temper Co. by a driver at a head speed of 45 m/s.*

*115. The three-piece golf ball of claim 27, wherein said golf ball has a spin of about 3300 rpm when hit using a swing robot manufactured by True Temper Co. by a driver at a head speed of 45 m/s.*

*116. The three-piece golf ball of claim 27, wherein said golf ball has a spin of about 3600 rpm when hit using a swing robot manufactured by True Temper Co. by a driver at a head speed of 45 m/s.*

*117. The three-piece golf ball of claim 27, wherein said golf ball has a spin of about 3920 rpm when hit using a swing robot manufactured by True Temper Co. by a driver at a head speed of 45 m/s.*

*118. The three-piece golf ball of claim 27, wherein said golf ball has a spin of about 3900 rpm when hit using a swing robot manufactured by True Temper Co. by a sand wedge at a head speed of 17.6 m/s.*

*119. The three-piece golf ball of claim 27, wherein said golf ball has a spin of about 4000 rpm when hit using a swing robot manufactured by True Temper Co. by a sand wedge at a head speed of 17.6 m/s.*

*120. The three-piece golf ball of claim 27, wherein said golf ball has a spin of about 4100 rpm when hit using a swing robot manufactured by True Temper Co. by a sand wedge at a head speed of 17.6 m/s.*

*121. The three-piece golf ball of claim 27, wherein said golf ball has a spin of about 4300 rpm when hit using a swing robot manufactured by True Temper Co. by a sand wedge at a head speed of 17.6 m/s.*

*122. The three-piece golf ball of claim 27, wherein said golf ball has a spin of about 5800 rpm when hit using a swing robot manufactured by True Temper Co. by a sand wedge at a head speed of 17.6 m/s.*

*123. The three-piece golf ball of claim 27, wherein said golf ball has a spin of about 6390 rpm when hit using a swing robot manufactured by True Temper Co. by a sand wedge at a head speed of 17.6 m/s.*

*124. The three-piece golf ball of claim 27, wherein said center core has a hardness between about 45 to 80 on the JIS C scale and wherein said intermediate layer has a thickness between about 1.5 mm and 3.5 mm.*

*125. A three-piece solid golf ball comprising: a center core, an intermediate layer, and a cover enclosing said center*

*core through the intermediate layer, said center core having a diameter of at least 29 mm and a specific gravity of less than 1.4, said intermediate layer having a thickness of at least 1 mm, a specific gravity of less than 1.2, and a hardness of at least 85 on JIS C scale, the specific gravity of said intermediate layer being lower than the specific gravity of said center core, and said cover having a thickness of 1 to 3 mm and being softer than said intermediate layer, wherein said center core has a hardness between about 60 to 80 on the JIS C scale.*

*126. The three-piece golf ball of claim 125, wherein said center core is formed from a rubber composition.*

*127. The three-piece golf ball of claim 126, wherein said center core plus intermediate layer has a diameter between about 38 mm and 41 mm.*

*128. The three-piece golf ball of claim 127, wherein said intermediate layer has a hardness between about 85 and 100 on the JIS C scale.*

*129. The three-piece golf ball of claim 128 wherein said cover has a hardness between about 50 and 85 on the JIS C scale.*

*130. The three-piece golf ball of claim 129, wherein said center core has a specific gravity of about 1.2.*

*131. The three-piece golf ball of claim 130, wherein said cover has a hardness between about 60 and 85 on the JIS C scale.*

*132. The three-piece golf ball of claim 129, wherein said center core has a diameter between about 29 mm and 37 mm.*

*133. The three-piece golf ball of claim 132, wherein said center core has a diameter of about 36 mm.*

*134. The three-piece golf ball of claim 132, wherein said cover has a thickness between about 1.5 mm and 2.5 mm.*

*135. The three-piece golf ball of claim 132, wherein said cover has a thickness of about 1.5 mm.*

*136. The three-piece golf ball of claim 132, wherein the said center core has a hardness between 66 and 79 on the JIS C scale.*

*137. The three-piece golf ball of claim 132, wherein said intermediate layer comprises an ionomer resin.*

*138. The three-piece golf ball of claim 132, wherein said intermediate layer comprises a blend of ionomer resins.*

*139. The three-piece golf ball of claim 132, wherein said center core plus intermediate layer has a diameter of about 39.7 mm.*

*140. The three-piece golf ball of claim 132, wherein said intermediate layer has a hardness between 85 and 91 on the JIS C scale.*

*141. The three-piece golf ball of claim 132, wherein said intermediate layer has a thickness between about 1.5 mm and 3.5 mm.*

*142. The three-piece golf ball of claim 132, wherein said intermediate layer has a thickness of about 1.7 mm.*

*143. The three-piece golf ball of claim 132, wherein said cover has a hardness between 61 and 78 JIS C.*

*144. The three-piece golf ball of claim 132, wherein the said center core has a hardness between 66 and 79 on the JIS C scale.*

*145. The three-piece golf ball of claim 128, wherein said center core plus intermediate layer has a diameter of about 40 mm.*

*146. The three-piece golf ball of claim 128, wherein said center core has a diameter of about 37 mm.*

*147. The three-piece golf ball of claim 128, wherein the said center core has a hardness between 66 and 79 on the JIS C scale.*

*148. The three-piece golf ball of claim 128, wherein said center core has a specific gravity of about 1.2.*

*149. The three-piece golf ball of claim 128, wherein said center core has a specific gravity between about 1.16 and 1.19.*

*150. The three-piece golf ball of claim 128, wherein said center core has a specific gravity of about 1.16.*

*151. The three-piece golf ball of claim 128, wherein said intermediate layer has a thickness between about 1.5 mm and 3.5 mm.*

*152. The three-piece golf ball of claim 128, wherein said cover has a thickness between about 1.5 mm and 2.5 mm.*

*153. The three-piece golf ball of claim 128, wherein said cover has a thickness of about 1.5 mm.*

*154. The three-piece golf ball of claim 128, wherein said intermediate layer comprises an ionomer resin.*

*155. The three-piece golf ball of claim 128, wherein said intermediate layer comprises a blend of ionomer resins.*

*156. The three-piece golf ball of claim 127, wherein said intermediate layer has a specific gravity that is between about 0.9 and 1.*

*157. The three-piece golf ball of claim 127, wherein said intermediate layer has a specific gravity of about 0.9.*

*158. The three-piece golf ball of claim 127, wherein said intermediate layer has a specific gravity of about 0.95.*

*159. The three-piece golf ball of claim 127, wherein said center core has a hardness of about 79 on the JIS C scale.*

*160. The three-piece golf ball of claim 127, wherein said center core has a hardness of about 80 on the JIS C scale.*

*161. The three-piece golf ball of claim 127, wherein said intermediate layer has a hardness of about 91 on the JIS C scale.*

*162. The three-piece golf ball of claim 127, wherein said intermediate layer has a specific gravity of about 0.95.*

*163. The three-piece golf ball of claim 127, wherein said cover has a hardness of about 60 JIS C scale.*

*164. The three-piece golf ball of claim 127, wherein said cover has a hardness of about 61 JIS C.*

*165. The three-piece golf ball of claim 127, wherein said center core has a diameter between about 36 mm and about 37 mm.*

*166. A three-piece solid golf ball, comprising: a center core, an intermediate layer, and a cover enclosing said center core through the intermediate layer; said center core made from a rubber-based composition and having a diameter of at least 29 mm and a specific gravity of less than 1.4;*

*said intermediate layer having a thickness of at least 1 mm, a specific gravity of less than 1.2, and a hardness of at least 85 on JIS C scale, the specific gravity of said intermediate layer being lower than the specific gravity of said center core; and said cover having a thickness of 1 to 3 mm and being softer than said intermediate layer, wherein said center core comprises polybutadiene rubber;*

*wherein said intermediate layer comprises a blend of ionomer resins; wherein said cover comprises a blend of ionomer resins; wherein said center core has a diameter between about 29 mm and 37 mm; wherein said center core has a hardness between about 45 to 80 on the JIS C scale; wherein said intermediate layer has a hardness between about 85 and 100 on the JIS C scale; wherein said cover has a hardness between about 50 and 85 on the JIS C scale; wherein said center core has a specific gravity between about 1.05 and 1.38; wherein said intermediate layer has a thickness between about 1.5 mm and 3.5 mm; and wherein said cover has a thickness less than about 2.5 mm.*

*167. A three-piece solid golf ball, comprising:*

*a center core, an intermediate layer, and a cover enclosing said center core through the intermediate layer; said center core having a diameter of at least 29 mm and a specific gravity of less than 1.4; said intermediate layer having a thickness of at least 1 mm, a specific gravity of less than 1.2, and a hardness of at least 85 on JIS C scale, the specific gravity of said intermediate layer being lower than the specific gravity of said center core; and said cover made from a thermoplastic composition and having a thickness of 1 to 3 mm and being softer than said intermediate layer, wherein said center core comprises cis-1,4 polybutadiene rubber; wherein said intermediate layer comprises a blend of low acid ionomer resins; wherein said center core has a diameter between about 29 mm and 37 mm; wherein said center core plus intermediate layer has a diameter between about 38 mm and 41 mm; wherein said center core has a hardness between about 60 to 80 on the JIS C scale; wherein said intermediate layer has a hardness between about 85 and 100 on the JIS C scale; wherein said cover has a hardness between about 60 and 85 on the JIS C scale; wherein said center core has a specific gravity between about 1.05 and 1.38; wherein a difference between a specific gravity of said center core and a specific gravity of said intermediate is between about 0.1 and 0.5; wherein said intermediate layer has a thickness between about 1.5 mm and 3.5 mm; and wherein said cover has a thickness less than about 2.5 mm.*

* * * * *